(12) United States Patent
Fullerton

(10) Patent No.: US 8,395,484 B2
(45) Date of Patent: Mar. 12, 2013

(54) SYSTEM AND METHOD FOR MONITORING OBJECTS, PEOPLE, ANIMALS OR PLACES

(75) Inventor: Larry W. Fullerton, New Hope, AL (US)

(73) Assignee: Cedar Ridge Research LLC, Huntsville, AL (US)

( * ) Notice: Subject to any disclaimer, the term of this patent is extended or adjusted under 35 U.S.C. 154(b) by 805 days.

(21) Appl. No.: 12/253,456

(22) Filed: Oct. 17, 2008

(65) Prior Publication Data

US 2009/0146793 A1    Jun. 11, 2009

Related U.S. Application Data

(63) Continuation-in-part of application No. 11/215,490, filed on Aug. 30, 2005, now Pat. No. 7,479,884.

(60) Provisional application No. 60/999,318, filed on Oct. 17, 2007.

(51) Int. Cl.
*H04Q 5/22* (2006.01)
*G08B 13/14* (2006.01)

(52) U.S. Cl. .................. 340/10.4; 340/10.1; 340/10.2; 340/10.31; 340/572.1; 340/572.9

(58) Field of Classification Search ............. 340/10.2, 340/10.31, 572.1, 572.9, 10.1, 10.4; 455/106; 342/4, 5, 6, 7, 45
See application file for complete search history.

(56) References Cited

U.S. PATENT DOCUMENTS

| | | | | |
|---|---|---|---|---|
| 5,621,412 | A * | 4/1997 | Sharpe et al. | 340/10.33 |
| 6,329,915 | B1 * | 12/2001 | Brady et al. | 340/572.1 |
| 6,457,179 | B1 | 10/2002 | Prendergast | |
| 6,657,580 | B1 * | 12/2003 | Edwards et al. | 342/51 |
| 6,862,748 | B2 | 3/2005 | Prendergast | |
| 7,034,688 | B2 * | 4/2006 | Rietzler et al. | 340/572.7 |
| 7,196,654 | B2 | 3/2007 | Edwards et al. | |
| 7,444,683 | B2 | 11/2008 | Prendergast et al. | |
| 2002/0113709 | A1 | 8/2002 | Helms | |
| 2002/0128052 | A1 | 9/2002 | Neagley et al. | |
| 2002/0140546 | A1 | 10/2002 | Tuttle | |
| 2003/0184440 | A1 | 10/2003 | Ballantyne | |
| 2006/0290451 | A1 | 12/2006 | Prendergast et al. | |
| 2007/0075831 | A1 | 4/2007 | Grego | |
| 2008/0272868 | A1 | 11/2008 | Prendergast et al. | |
| 2008/0284568 | A1 * | 11/2008 | Kumar | 340/10.1 |

\* cited by examiner

*Primary Examiner* — Daniel Wu
*Assistant Examiner* — Mancil Littlejohn
(74) *Attorney, Agent, or Firm* — Venable LLP; Robert S. Babayi

(57) ABSTRACT

An improved system and method for monitoring objects, people, animals, or places uses a passive Modulating Reflector (MR) tag where a characteristic of an antenna is modified according to a time-varying pattern by a modulating network thereby causing the reflective characteristics of the antenna to vary in accordance with the time-varying pattern. When an interrogator transmits an RF waveform that impinges on the antenna, the return signal reflecting off the antenna is modulated in accordance with the time-varying pattern allowing a remote receiver to demodulate information from the modulated return signal. The antenna is embedded in a dielectric material. The MR tag can be used with a wide variety of tag-interrogator configurations employing monostatic and/or bistatic radar techniques to allow monitoring, locating, and/or tracking of objects, people, animals, or place with which MR tags are associated.

18 Claims, 17 Drawing Sheets

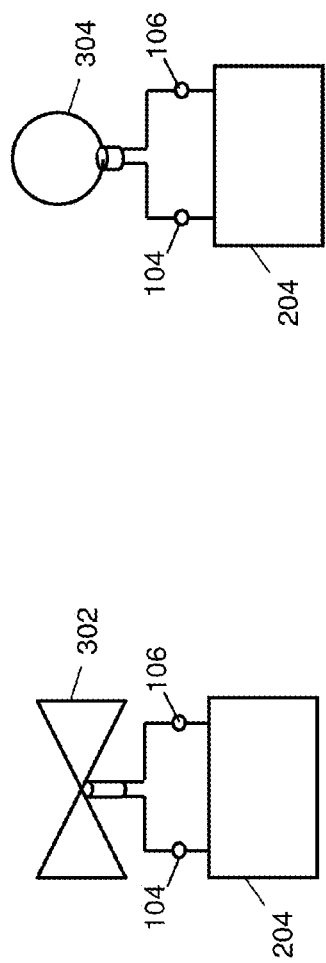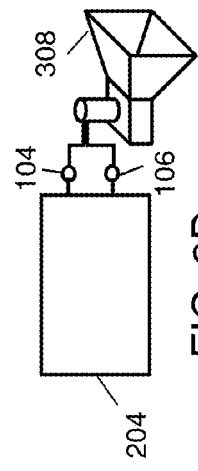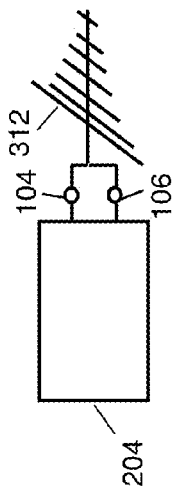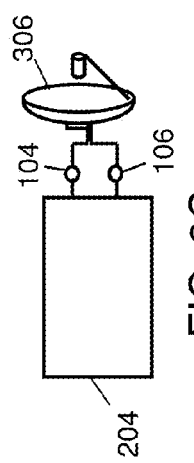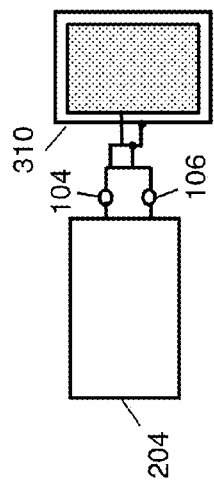

SYSTEM AND METHOD FOR MONITORING OBJECTS, PEOPLE, ANIMALS OR PLACES

CROSS-REFERENCE TO RELATED APPLICATIONS

This application is a continuation-in-part of U.S. Nonprovisional application Ser. No. 11/215,490, filed Aug. 30, 2005, which claims the benefit of U.S. Provisional Application No. 60/605,720, filed Aug. 31, 2004. This application claims the benefit of U.S. Provisional Application No. 60/999,318, filed Oct. 17, 2007. The aforementioned patent applications are each incorporated herein by reference in their entireties.

FIELD OF THE INVENTION

The present invention relates generally to a system and method for monitoring objects, people, animals, or places. More particularly, the present invention relates to monitoring objects, people, animals, or places using tags and an interrogator.

BACKGROUND OF THE INVENTION

It is often desirable or necessary to monitor objects, people, animals or places, which may involve the monitoring of information about the objects, people, animals or places; locating the objects, people, animals or places; and/or tracking the objects, people, animals, or places. One approach for monitoring, for example, an object involves associating an active tag with the object. An active tag transmits an radio frequency (RF) signal that can be received by a suitable receiver, which can demodulate the signal to determine the tag's identification and be used to locate the tag. Active tags can be transmit-only devices or can be transceivers capable of transmitting and receiving. Transmit-only tags can transmit continuously or periodically (e.g., for 1 second every 10 seconds). Such tags may stay in a powered down 'sleep' mode until interrogated in which case they 'power up' and begin transmitting. Transmit-only tags can be associated with a sensor or some other device and transmit only when a condition is met (e.g., smoke is detected). Transceiver-type tags may continuously or periodically (e.g., for 1 second every 10 seconds) 'listen' for a 'tag request' signal, which can be received and demodulated, and if the received signal has the appropriate data (e.g., the identifier for a particular tag or tags), then one or more of the tags may respond.

Another approach for monitoring an object, for example, involves associating an inductive RFID tag with the object. With this approach an interrogator uses a loop of wire to inductively communicate with and possibly power the inductive tag by modulating the loading of the loop with a modulation signal.

A passive approach for monitoring an object, for example, involves associating a RF backscatter tag with the object. An RF backscatter tag consists of a resonant antenna having a resistive load placed across its terminals that is varied to impose an Amplitude Modulated (AM) envelope onto its reflection characteristics, thereby conveying a signal back to an interrogator via the modulated reflection. The receive antenna is usually connected to a rectifier that converts the RF received from the interrogator to DC to power the circuit. These passive tags typically operate in the microwave spectrum. Existing passive tags, however, have limited signal-to-noise (SNR) and thus require the interrogator to be within close range of the tag and/or operate at a low data rate. As such, a system and method is needed that significantly increases the signal-to-noise (SNR) of passive tags in order to allow tracking and locating at much greater ranges and much higher data rates.

SUMMARY OF THE INVENTION

The present invention is an improved system and method for monitoring objects, people, animals, or places using a passive Modulating Reflector (MR) tag. In one embodiment, any one or any combination of the impedance, delay, phase, polarization or attenuation characteristics of an antenna are modified in accordance with a time-varying pattern such that when an interrogator's RF waveform impinges on the antenna, the return signal reflecting off the antenna is likewise modulated as a result of the modification of the antenna characteristics. The information contained in this signal can then be demodulated by a remote receiver, typically contained within the interrogator.

In another embodiment the tag is powered by a self-contained battery or other local energy source.

In a further embodiment, Direct Sequence Spread Spectrum (DSSS) techniques are applied to channelize the tags and give them some immunity to RF noise sources in the same band, including other interrogators and tags. In a preferred embodiment, the DSSS modulation is imposed on the interrogation waveform by the interrogator.

In yet another embodiment, the MR tag's antenna structure is incorporated into a retro reflector. In yet another preferred embodiment, the retro reflector is embedded inside a dielectric material having a desired geometry.

In still another embodiment, the MR tag's antenna structure is constructed as a phased array allowing the reflective direction of the antenna structure to be programmable by varying and controlling the delays or phase shifts of the antenna elements.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3A illustrates an embodiment of the invention incorporating a bowtie antenna;

FIG. 3B illustrates an embodiment of the invention incorporating a loop antenna;

FIG. 3C illustrates an embodiment of the invention incorporating a dish antenna;

FIG. 3D illustrates an embodiment of the invention incorporating a horn antenna;

FIG. 3E illustrates an embodiment of the invention incorporating a printed antenna;

FIG. 3F illustrates an embodiment of the invention incorporating a 7-element Yagi antenna;

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Antennas are electromagnetic structures that are used for transmitting and receiving electromagnetic radiation. When a current having an appropriate frequency is applied to the terminals of an antenna structure, it is caused to convert some of the power applied to the terminals into electromagnetic radiation that is then radiated, or transmitted, by the antenna structure into space. Conversely, when electromagnetic radiation having appropriate frequency and polarity encounter an antenna structure, electromagnetic radiation can be absorbed, or received, by the antenna structure and converted into a current that appears at the terminals. However, depending on how the antenna structure is terminated, some of the electromagnetic radiation can be reflected back to the antenna and reemitted into space.

Figure 1C:
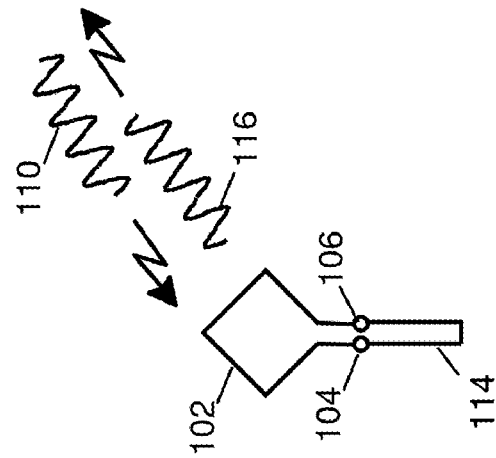
FIG. 1C illustrates an incoming RF wave reflecting off a receive antenna having a shorted circuit thereby resulting a reflected RF wave having a second polarity.
Figure 1B:
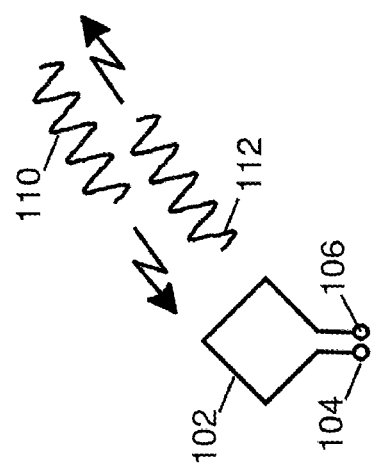
FIG. 1B illustrates an incoming RF wave reflecting off a receive antenna having an open circuit thereby resulting a reflected RF wave having a first polarity.
Figure 1A:
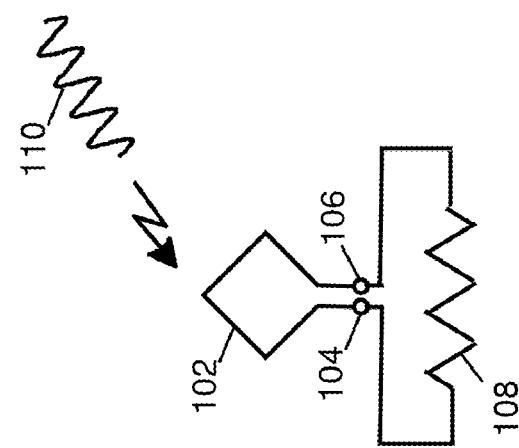
FIG. 1A illustrates a receive antenna having an impedance matched load absorbing an incoming RF wave.

FIGS. 1A-1C illustrate different absorption and reflection characteristics of an antenna resulting from a difference in how it is terminated. FIG. 1A shows antenna structure 102 having terminals 104, 106 across which a 'characteristic' (or matched) impedance 108 is applied. When an antenna is terminated by a load matching the impedance of the terminals, most of the electromagnetic energy 110 encountering the antenna structure will be absorbed by that load and very little energy will be reflected back to the antenna structure for reemission. The antenna effectively absorbs the incoming wave. However, when a load is applied to the terminals of a receive antenna that does not match the characteristic impedance of the antenna terminals then some of the energy will be reflected back to the antenna structure. When such a current is reflected back to the antenna some of that current will be converted to electromagnetic energy and will be radiated back (or reemitted) into space. Note that the impedance that matches the impedance of a well designed antenna structure operating within its nominal frequency range is essentially a pure resistive impedance and accordingly is illustrated that way in FIG. 1A for clarity. In some cases contemplated by the inventor, however, an antenna may be either undersized or oversized relative to its resonant wavelength. An undersized antenna will be capacitive and will need a resistor-capacitor network to match it. Whereas, an oversized antenna will be inductive and require a resistor-inductor network for a match.

FIG. 1B depicts antenna structure 102 having terminals 104, 106 that are open circuited. If the terminals of the antenna are open circuited, some of encountered electromagnetic energy 110 is reflected back to the antenna structure and return signal 112 is emitted having the same frequency and polarity as the encountered electromagnetic energy 110.

FIG. 1C depicts antenna structure 102 having terminals 104, 106 that are short circuited by short circuit 114. If the terminals of the antenna are short circuited, some of encountered electromagnetic energy 110 is reflected back to the antenna structure and inverted return signal 116 is emitted having the same frequency and opposite polarity as the encountered electromagnetic energy 110.

The inventor recognized that if a remote transceiver (i.e., transmitter/receiver) radiates waves toward an antenna that is being alternately short and open circuited in accordance with a pattern then the remote transceiver will receive waves radiating back from the structure that are alternately of one phase and 180° phase shifted, or inverted in polarity, in accordance with the same pattern. As such, the terminals of an antenna structure can be short and open circuited as a form of Phase Shift Keying modulation in order to convey data from the antenna structure back to the remote transceiver. This modulating reflector approach to conveying data is done without the antenna structure receiving or transmitting in the usual sense and therefore conventional transmit and receive circuitry is not required. As such, a very low power, semi-passive MR can be produced from an antenna structure and what little circuitry is required to short and open it in accordance with a pattern known by the transceiver (or interrogator).

Various other novel methods can be used by the present invention to modulate an incoming signal before re-emitting it. In accordance with the invention, the MR tag can modulate an incoming signal by varying any one or a combination of the amplitude, phase angle, polarization angle, time delay, polarity, and direction of the reflected (re-emitted) signal. Modulation of the incoming wave via any of these modes may be either linearly or discretely varied before returning the RF energy back to the MR tag's antenna structure. For example, the phase angle of the incoming wave can be modulated by either continuous or by discrete values from 0° to 360° of rotation before returning it to the MR tag's antenna.

One exemplary modulation mode utilized by the MR tag is conventionally called Binary Phase Shift Keying (BPSK). In one embodiment involving BPSK modulation, a carrier's phase is modulated only by the values ±90° and the sequence of the phase shifts is made according to a suitable coded pattern, e.g. maximal length sequence codes generated by a feedback shift register.

There are many types and lengths of CDMA codes that may be used by the tag. An exemplary example would be a Gold code which is a combination of two pseudo random codes, one longer than the other which permits rapid lock with a poor signal-to-noise level, but then quickly allows locking to the longer sequence that achieves optimal performance. Codes may be selected based upon their correlation properties (i.e., autocorrelation and/or cross-correlation) and/or spectral properties.

It is further anticipated that many otherwise conventional modulation methods may be utilized by the MR tag and the description of the modulation examples above is not intended to limit it to these methods. Some of these modulation methods that may be utilized either alone or in combination with the others include: Frequency Modulation (FM), Amplitude Modulation (AM), Phase Shift Keying (PSK), Quadrature Phase Shift Keying (QPSK), Higher orders of PSK, Trellis, and Pulse Amplitude Modulation (PAM).

It is often desirable to field a plurality of tags so as to track and locate a plurality of objects. As such Direct Sequence Spread Spectrum (DSSS) coding techniques can be used with the MR tags to provide channelization and to give them some immunity to RF noise sources in the same band, including other interrogators and MR tags.

In a preferred embodiment, the additional DSSS modulation uses a modulation rate such that its resulting modulation (i.e., information and code) bandwidth would be greater than the bandwidth required by the information alone. According to the theory of spread spectrum, narrow band interference within the occupied RF band can then be reduced by approximately the ratio of the DSSS bandwidth to the information bandwidth.

DSSS modulation can be imposed on the interrogation waveform by the MR tag or by the interrogator. The use of DSSS modulation on the interrogation waveform would be primarily to channelize it with respect to waveforms produced by other interrogators within reception range that have the potential to cause mutual interference. Another purpose would be to reduce its "signature" to hostile receivers in applications in which it is desirable that the interrogator be as innocuous as possible, such as in a warfare or law enforcement environment.

Figure 2:
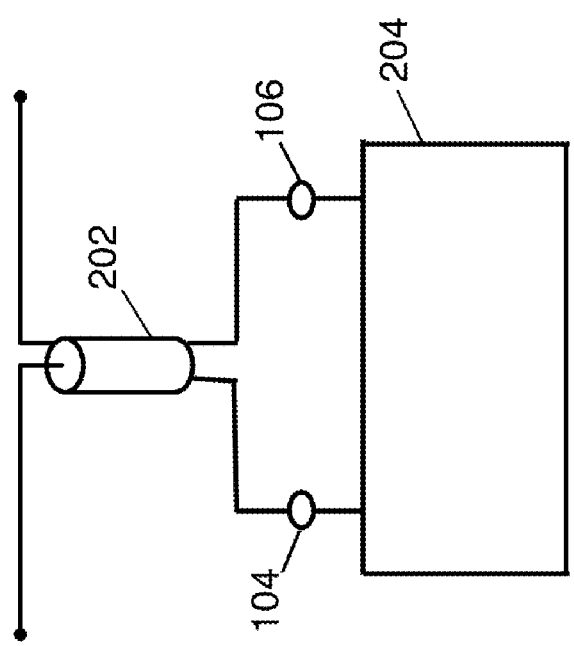
FIG. 2 illustrates an exemplary modulating reflector of the present invention where an antenna is connected to a block symbolizing a modulating network.

FIG. 2 illustrates an exemplary modulating reflector of the present invention where an antenna 102 is connected to a block symbolizing a modulating network where the modulating network would include appropriate circuitry required to implement one or more of the various modulation methods described above.

FIGS. 3A-3F illustrate different embodiments of antennas that can be used with the present invention. In FIG. 3A, modulating network 204 is connected across terminals 104, 106 to bowtie antenna 302. In FIG. 3B, modulating network 204 is connected across terminals 104, 106 to loop antenna 304. In FIG. 3C, modulating network 204 is connected across terminals 104, 106 to dish antenna 306. In FIG. 3D, modulating network 204 is connected across terminals 104, 106 to horn antenna 308. In FIG. 3E, modulating network 204 is connected across terminals 104, 106 to printed antenna 310.

In FIG. 3F, modulating network 204 is connected across terminals 104, 106 to 7 element Yagi antenna 312. One of ordinary skill in the art will recognize that a multitude of antenna types, each with its own antenna characteristics, can be employed in accordance with the present invention so as to achieve appropriate performance given operational conditions for which the antennas are intended.

Figure 4C:
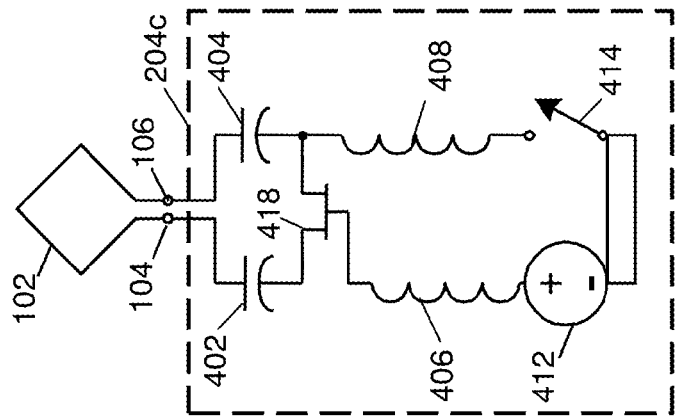
FIG. 4C illustrates an embodiment of a modulating network of the invention incorporating a field effect transistor switched short.
Figure 4B:
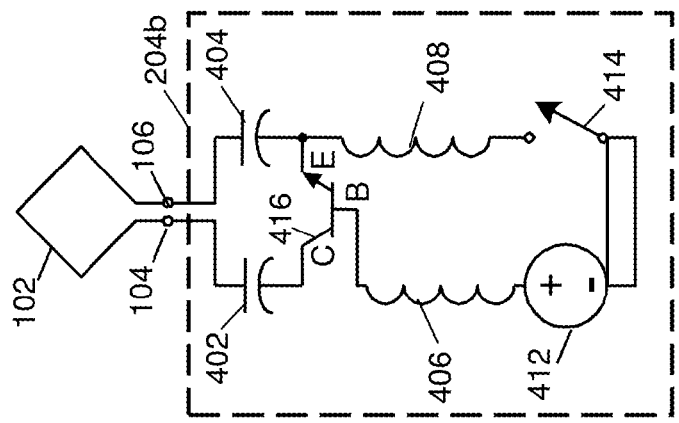
FIG. 4B illustrates an embodiment of a modulating network of the invention incorporating a bipolar transistor switched short.
Figure 4A:
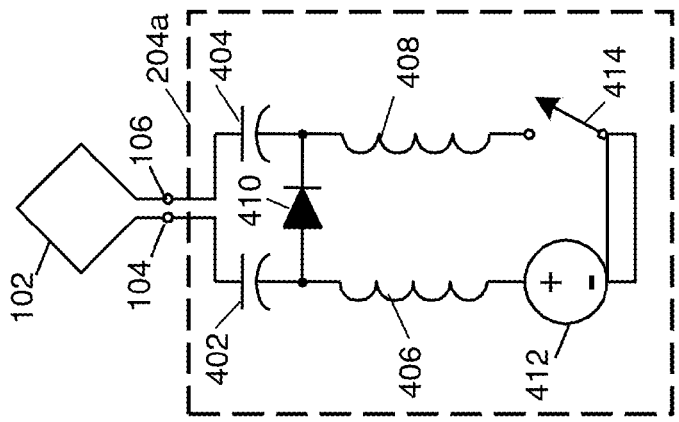
FIG. 4A illustrates an embodiment of a modulating network of the invention incorporating a diode switched short.

FIG. 4A-4C illustrate three embodiments of a modulating network whereby a active element is used to short circuit/open circuit modulate an exemplary loop antenna. The three active elements shown in FIGS. 4A-4C are a diode, a bipolar transistor, and a field effect transistor, respectively. In each case the active component is caused to be either high or low impedance depending on the bias current supplied to it. The inductors and capacitors are used to isolate the modulating circuit from the RF circuit. The capacitors are chosen to have low impedance with respect to the RF frequencies and high impedance to the modulating frequencies. Conversely, the inductors are chosen to present high impedance to the RF frequencies and low impedance to the modulating frequencies.

In FIG. 4A, antenna 102 having terminals 104, 106 is connected to modulating network 204a. Specifically, terminal 104 is connected to capacitor 402 and terminal 106 is connected to capacitor 404. Capacitors 402 and 404 are connected in series with inductors 406 and 408, respectively. Diode 410 is connected at the junction between capacitor 402 and inductor 406 and at the junction between capacitor 404 and inductor 408. Inductor 406 is connected to power source 412 which is in turn connected to one side of switch 414. Inductor 408 is connected to to the other side of switch 414. As such, switch 414 can be used to open and short circuit antenna 102.

In FIG. 4B, antenna 102 having terminals 104, 106 is connected to modulating network 204b. Specifically, terminal 104 is connected to capacitor 402 and terminal 106 is connected to capacitor 404. Capacitor 402 is connected to the collector of bipolar transistor 416. Capacitor 404 is connected in series with inductor 408. The emitter of bipolar transistor 416 is connected to the junction between capacitor 404 and inductor 408 and the base of bipolar transistor 416 is connected to inductor 406. Inductor 406 is connected to power source 412 which is in turn connected to one side of switch 414. Inductor 408 is connected to to the other side of switch 414. As such, switch 414 can be used to open and short circuit antenna 102.

In FIG. 4C, antenna 102 having terminals 104, 106 is connected to modulating network 204c. Specifically, terminal 104 is connected to capacitor 402 and terminal 106 is connected to capacitor 404. Capacitor 402 is connected to the source of field effect transistor 418. Capacitor 404 is connected in series with inductor 408. The drain of field effect transistor 418 is connected to the junction between capacitor 404 and inductor 408 and the gate of field effect transistor 418 is connected to inductor 406. Inductor 406 is connected to power source 412 which is in turn connected to one side of switch 414. Inductor 408 is connected to to the other side of switch 414. As such, switch 414 can be used to open and short circuit antenna 102.

The power source 412 of FIGS. 4A-4C can be a self-contained battery or a local energy source.

If the power source and switch in FIGS. 4A-4C are replaced by a variable current then the loading on the antenna can be linearly varied from short circuit to open circuit, thereby giving it the ability to vary the reemitted wave through all values from 0° to 180° of phase shift. This gives the modulator the ability to perform higher orders of modulation including FM, AM, BPSK and PAM.

If the diode of FIG. 4A is replaced by a phase shift or delay network consisting of inductors, capacitors and possibly resistors, then the phase and/or amplitude of the received RF may be modified before returning it to the antenna for reemission. If one or more of these elements are variable at a rate high enough to support data modulation, then such a network will support the modes of modulation that include n-ary coding, generalized PSK, QPSK and trellis. The delay or phase shift may also be accomplished through the use of discrete delay elements such as strip lines, coaxial cable or other conventional delay means. The networks that may be used to accomplish this delay or phase shift are generally known in the art. Examples include variactors in reactive networks and PIN diode switched discrete delay lines.

In order to improve the gain or radar cross section (RCS) of the MR tag with respect to the interrogator, the tag's antenna structure may be incorporated into a retro reflector.

Retro reflectors are generally known in the RADAR art and are used to increase the amount of reflected energy that is returned to a RADAR from a target in a manner that is generally independent of the angle between the RADAR and the retro reflector. It operates to return incoming waves directly back to the RADAR regardless of this angle, and thereby presents a high RCS target. When a MR tag's antenna structure is incorporated into such a retro reflector, the effective range and/or data rate at a given range can be substantially increased. In the simplest embodiment the MR tag's antenna structure may be centered within a standard corner reflector, or trihedral, so that it modifies the wave both as it enters and as it leaves. This simple method has the drawback however of inducing a destructive interference at some angles that would have otherwise been within the capability of the retro reflector to return RF energy to the interrogator. In the invention it is disclosed that improved angular capability can be achieved by placing the MR tag's antenna (or antennas) on one or more faces of a corner reflector. In this way there is no potential for destructive interference between the incoming and outgoing wave which allows the retro reflectors full angular capability to be utilized.

Similarly, other generally known retro reflector structures may be utilized, such as the Luneberg Lens. It is also the intent of this invention to utilize artificial negative refractive index materials to synthesize an essentially flat retro reflector/modulating antenna structure. A summary of these materials can be found in the Aug. 6, 2004 issue of Nature on page 788.

"Reflected Direction" may be accomplished by constructing the MR tag's antenna structure as a phased array. Each individual element of the array would have the ability to delay or phase shift the incoming RF before returning it to its own element. When these delays or phase shifts are properly set according to the array geometry then the outgoing wave can be programmed to emit in any desired direction with respect to the direction of the incoming wave. It acts as though it is a plane mirror situated at an angle with respect to the interrogator. If all the delays or phase shifts are zero or a multiple of $2\pi$ of the incoming wave's frequency, then the array acts as a plane mirror positioned in exactly the plane of the antenna structure itself. Otherwise the physical array and the plane of reflection can be programmed by varying and controlling the delays or phase shifts of the antenna elements in which case the effective reflection plane vs. the physical array angle will be in accordance with the programmed delays or phase shifts.

As an element of this invention, a programmable reflection direction can be used to sweep the reemitted RF in an area or solid angle to act in lieu of a retro reflector. By sweeping the angle of the reflection it will eventually reflect back to the interrogator regardless of the physical angle that exists between them, thereby giving the effect of a retro reflector but allowing a flat form factor rather than the larger volume required of a physical retro reflector such as a trihedral.

Figure 10A:
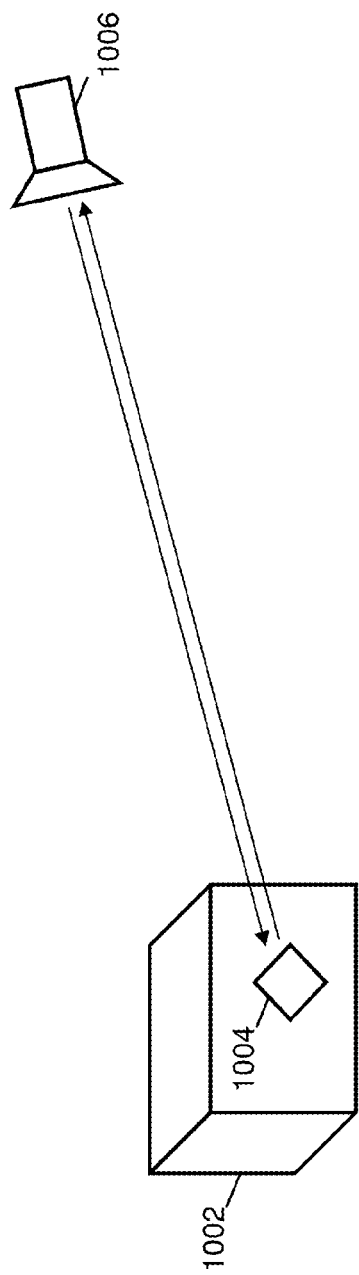
FIG. 10A depicts a first exemplary tag-interrogator architecture.

Various forms of interrogators can be used in accordance with the invention. Under one arrangement, a conventional monostatic x-band radar is used as an interrogator, for example, one like those used to detect the speed of vehicles or baseballs. With a monostatic radar, the interrogation signal is transmitted from the same location that the return signal is received. FIG. 10A depicts an exemplary tag-interrogator architecture where an object 1002 has associated with it a MR tag 1004 that is interrogated by a transceiver 1006 functioning as a monostatic radar.

Figure 10B:
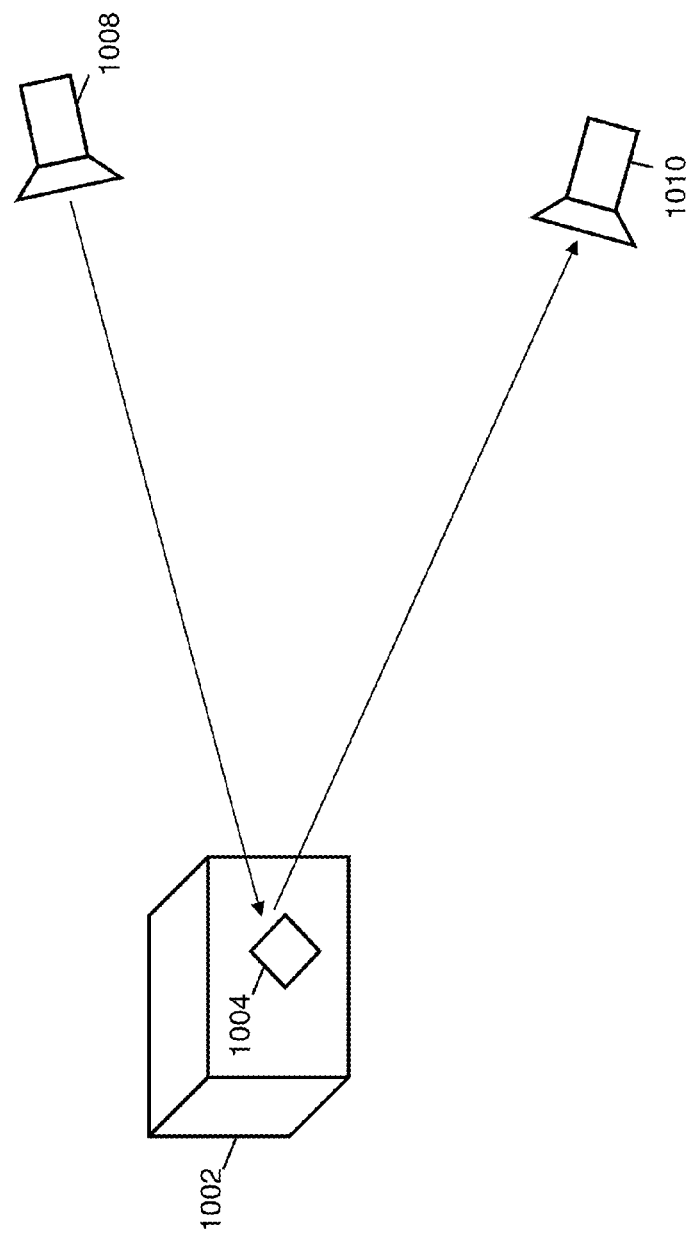
FIG. 10B depicts a second exemplary tag-interrogator architecture.

Under another arrangement, a bistatic radar configuration is employed where an interrogation signal is transmitted from one location and the return signal is received at another location. In this case, the receiver will lock on the transmitted signal in order to derive its local oscillator's frequency and phase to achieve coherency with the signal that is emitted from tags being interrogated. Coherency is desirable as it improves the range and signal-to-noise performance of the receiver. FIG. 10B presents an exemplary tag-interrogator architecture where an object 1002 has associated with it a MR tag 1004 that is interrogated by a transmitter 1008 and receiver 1010 functioning as a bistatic radar.

Figure 10C:
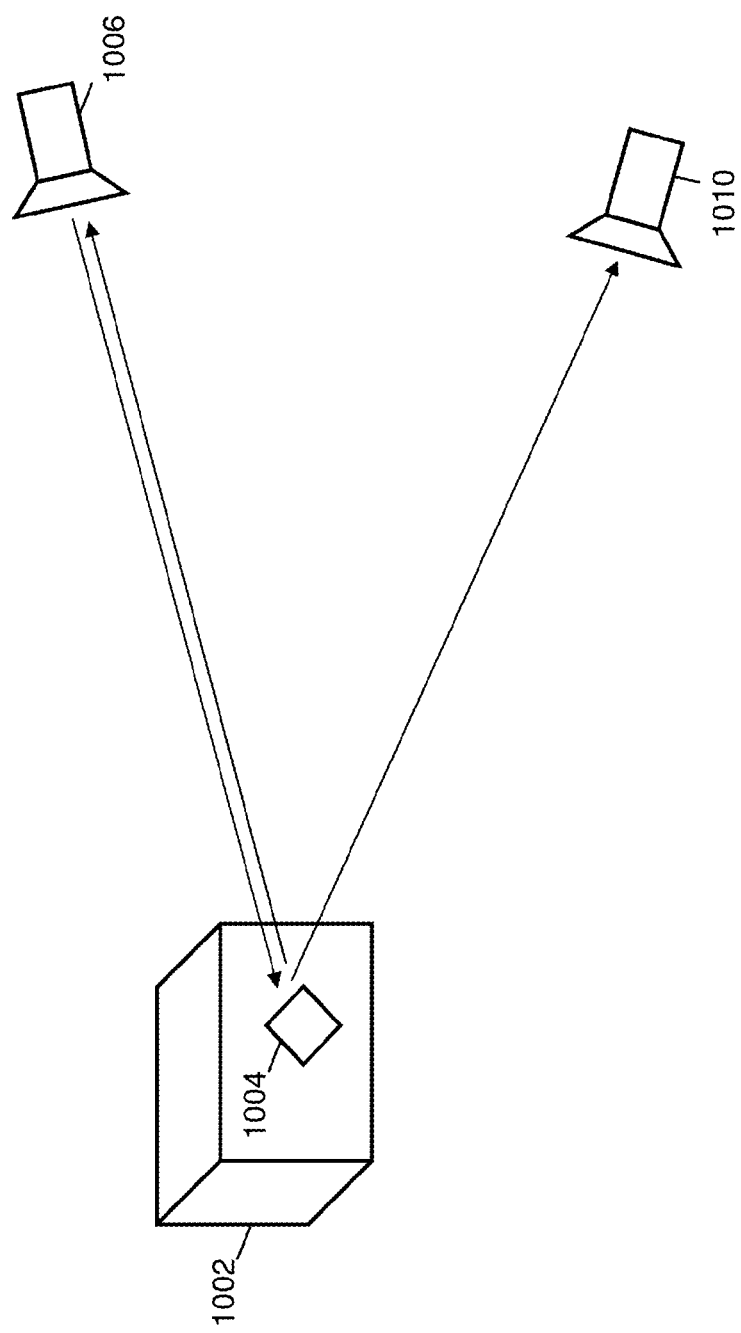
FIG. 10C depicts a third exemplary tag-interrogator architecture.
Figure 10D:
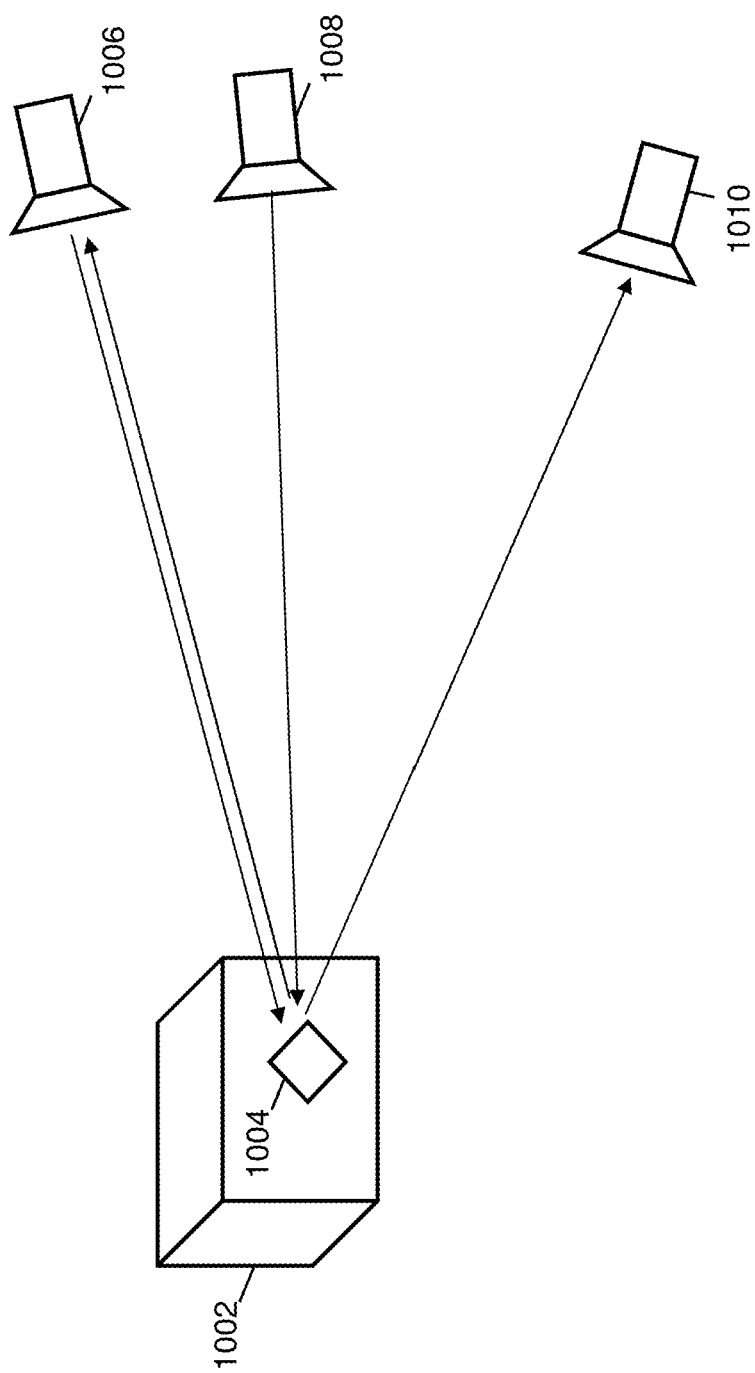
FIG. 10D depicts a fourth exemplary tag-interrogator architecture.

Various bistatic radar configurations can be used involving various combinations of one or more transmitters with one of more receivers. For example, a warehouse might be instrumented with several receivers at fixed locations and a transmitter at a fixed location, all of which are time synchronized. With the known locations, the synchronized transmitter and receivers can determine the position of the tag by processing the return signals using triangularization techniques. The configuration can be reversed, where multiple transmitters are used with a single receiver. And, various combinations can be employed using both multiple transmitters and multiple receivers. Furthermore, combinations of monostatic and bistatic radars can be used. For example, a plurality of transceivers could be employed where each acts as a monostatic radar and also collaborates with the other transceivers to act as bistatic radar. As such, the transceivers can fully exploit back-scattering (monostatic) and forward-scattering (bistatic) effects of the tag within a given environment. Generally, one with ordinary skill in the art will recognize that a variety of configurations of transmitters, receivers, and/or transceivers, synchronized and/or non-synchronized, can be used with various time-of-flight and/or differential time-of-arrival distance determination techniques as might be desirable for a given application of the invention. FIG. 10C depicts an exemplary tag-interrogator architecture where an object 1002 has associated with it a MR tag 1004 that is interrogated by a transceiver 1006 and a receiver 1010 where transceiver 1006 functions as monostatic radar and the transceiver 1006 and receiver 1010 together function as a bistatic radar. Similarly, FIG. 10D depicts an exemplary tag-interrogator architecture where an object 1002 has associated with it a MR tag 1004 that is interrogated by a transceiver 1006, transmitter 1008, and a receiver 1010 where transceiver 1006 functions as monostatic radar, transmitter 1008 and receiver 1010 function as a bistatic radar, transmitter 1008 and transceiver 1006 together function as a bistatic radar, and transceiver 1006 and receiver 1010 together function as a bistatic radar. Clearly, a large variety of architectures can be employed using different combinations of transceivers, transmitters, and receivers as required to best meet specific requirements.

In operation, the interrogator must determine the range to the tag. With one approach, it employs a range gate to isolate the return signals corresponding to a given range from those that may exist from other ranges that would otherwise provide interference. It sweeps a range gate through different time delays corresponding to different ranges at which the tag may be located. When the tag uses a CDMA code, then for each range gate swept, the interrogator must also search CDMA code phases. If the CDMA code used by the tag is among several possible codes, then the interrogator must search the CDMA code phases of the several possible codes for each range gate swept. In an alternative approach, the interrogator determines code lock before determining range.

Typically, the time width of the range gate is commensurate with the pulse width of the interrogating signal. For example if the interrogating signal is 10 ns wide then the range gates would also be 10 ns wide, giving a range resolution of 5 feet for tag range determination. However, the width of the range gate may be selected to be less than or greater than the pulse width of the interrogating signal to accommodate characteristics of the tag and/or characteristics of the RF environment that effect the characteristics of the return signal.

Finally, it is also possible to use ambient RF sources as tag interrogators. The receiver will again lock onto the frequency and phase of this ambient source to provide for coherent reception. Under one arrangement, a receiver may demodulate based upon the IF output of an existing radar.

In practice, multipath reflections improve the range performance of the interrogator-tag system. As such, when used in a high multipath environment, the interrogator's beamwidth can be broadened to include a swath of the reflecting environment rather than using a very narrow beamwidth.

The choice of operating frequency used by an interrogator will be a trade off of requirements of the operating environment and local regulatory requirements. Low frequency range of operation improves the penetration through walls and intervening objects that might be present in an office environment, for example, but increases the required size of the antenna and retro reflector. To accommodate a given operational environment, an interrogator can include any of or a combination of the following emissions:

Continuous wave, an unmodulated carrier that can be used to locate the tag in azimuth and retrieve its modulation but cannot determine its range, RF pulse, an enveloped carrier which can not only retrieve the modulation of the tag and determine its azimuth with respect to the interrogator but also its range Chirp, has performance similar to the RF pulse but accomplished by sweeping the carrier over a band of frequencies DSSS, or Direct Sequence Spread Spectrum also performs like the RF pulse but does so with a carrier whose phase is switched 180 degrees according to a code Phase coded carrier also performs like the RF pulse but does so with a carrier whose phase is modulated continuously Linear, circular or elliptical polarized carrier may be used to provide isolation between the interrogator's outgoing signal and the retro reflected signal from the tag, as the tag's reflection is at a different polarization angle that that of the carrier transmitted by the interrogator.

It is possible to use either a homodyne or a heterodyne receiver in the interrogator. A homodyne receiver has a relatively high noise figure, often exceeding 12 dB but it is very inexpensive to manufacture and works with very low battery power. A higher performance receiver can be made using a heterodyne receiver but it draws more power and is more expensive. Also, either method can be improved by the use of an in phase and a quadrature reception channel.

Under one arrangement, sequential or simultaneous discrete frequencies are used in conjunction with an FFT algorithm to reconstruct a high special resolution waveform in lieu of a chirp waveform. For example, 256 frequencies evenly spaced between 10 GHz to 11 GHz could be employed to achieve a 1 GHz bandwidth. With this approach, an IQ (both in-phase and quadrature) receiver detects the amplitude and phase of each reemitted frequency, puts them into a proper real and imaginary array, and uses an inverse FFT algorithm to return it to the time domain, thereby rendering a range estimate to the tag to a resolution of 6".

Figure 5:
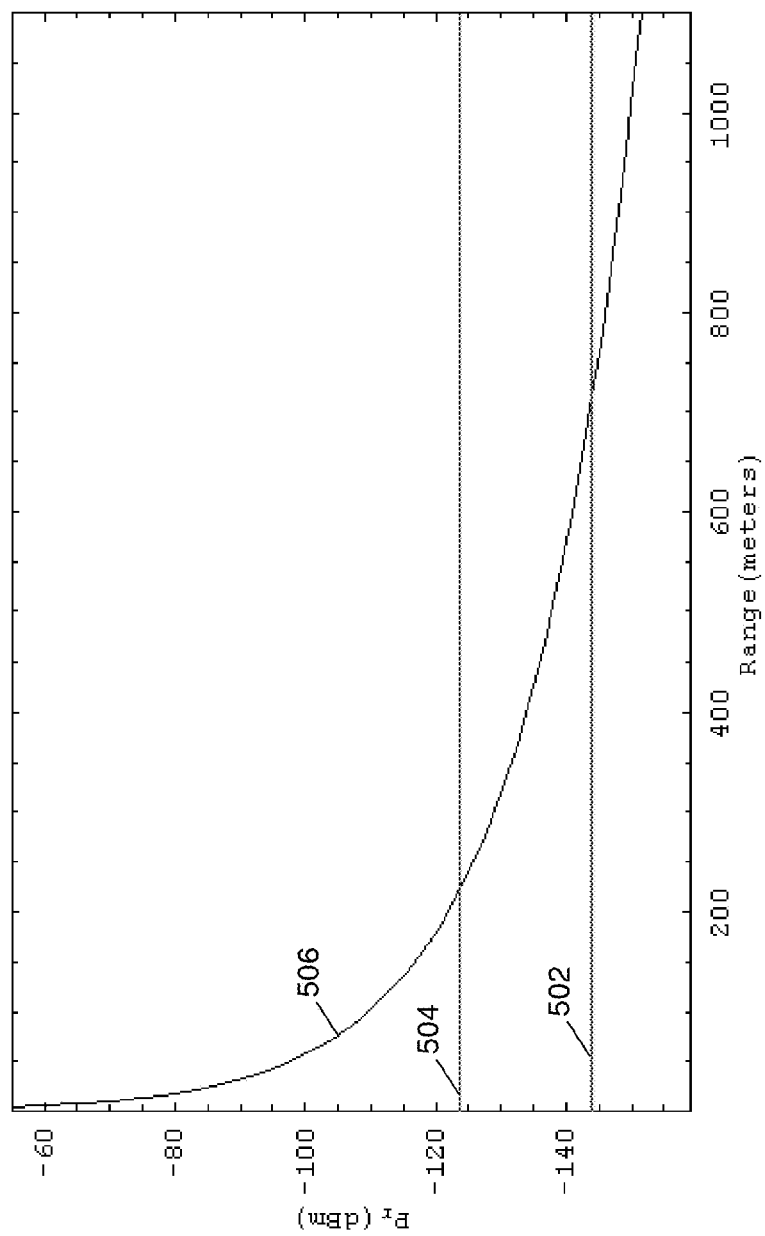
FIG. 5 illustrates the signal expected to be received by an interrogator using 100 mW of effective power that is located at various ranges from a tag having 3 dB gain.
Figure 6:
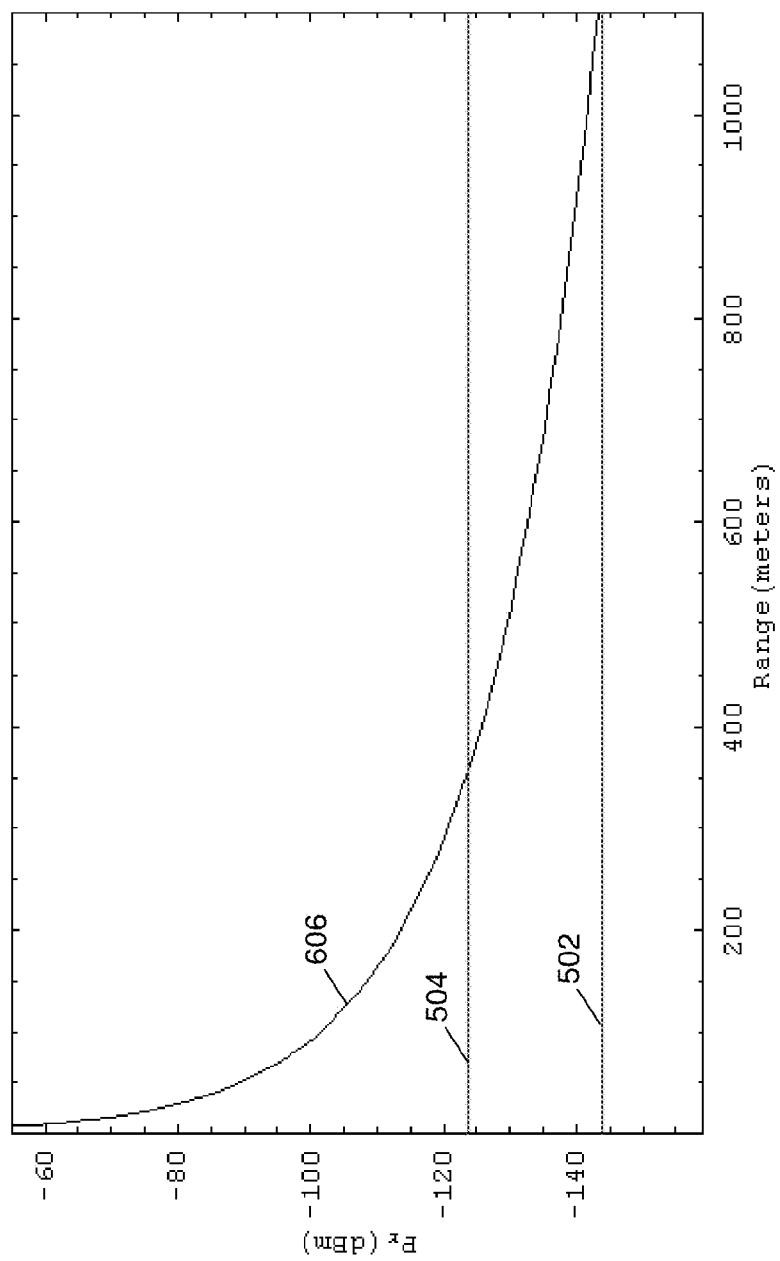
FIG. 6 illustrates the signal expected to be received by an interrogator using 100 mW of effective power that is located at various ranges from a tag having 20 dB gain.
Figure 7:
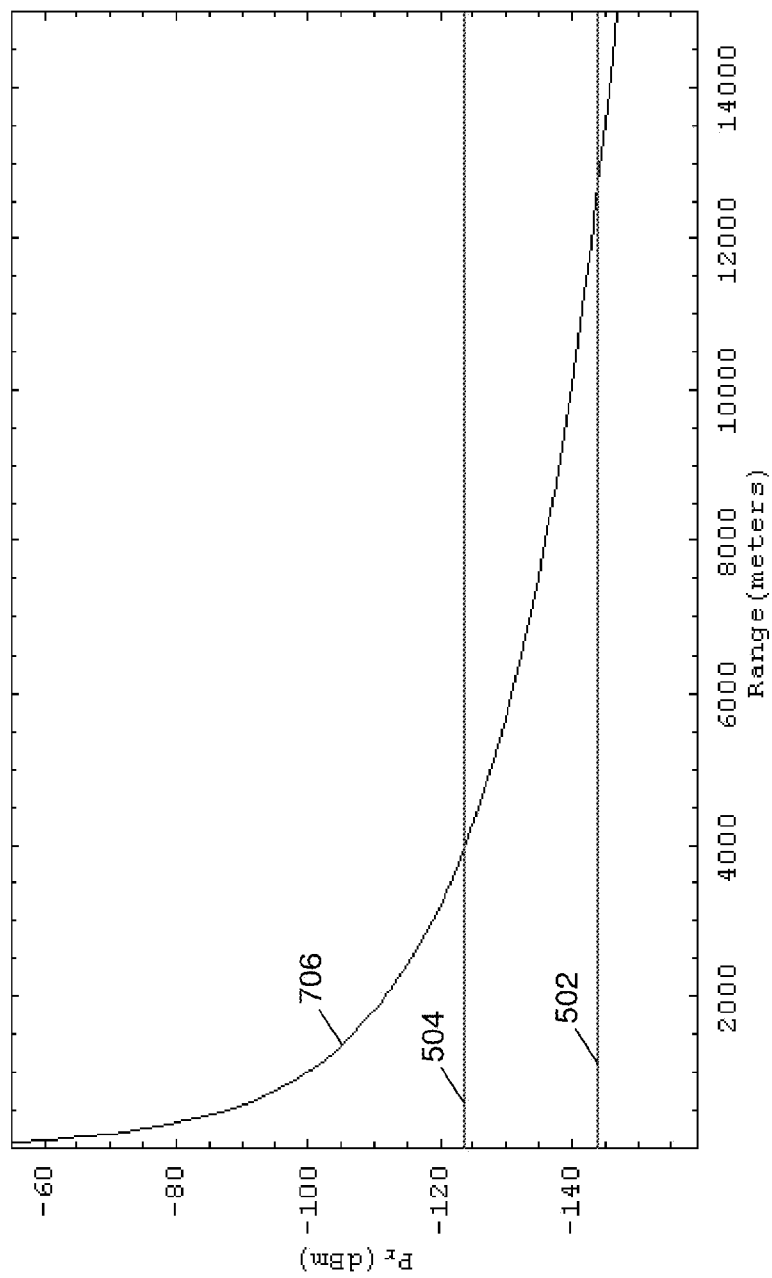
FIG. 7 illustrates the signal expected to be received by an interrogator using 10 KW of effective power that is located at various ranges from a tag having 3 dB gain.

FIGS. 5-7 illustrate the signal expected to be received by an interrogator located at various ranges and using 1 mW to 10 KW of effective radiated power. The other parameters that define the plots are shown next to each plot. Dipole antennas were assumed for the tags and they were assumed to be ideally aligned with their polarization parallel to the interrogator's polarization. Each was also assumed to be placed inside a trihedral retro reflector whose size is indicated.

With FIGS. 5 and 6, an interrogator signal having a frequency of 10 GHz and transmit power of 100 mW is transmitted from a transmit antenna having 12 dB gain. Thermal noise limits 502, 504 are shown for 1 KHz and 100 KHz bandwidths, respectively. With FIG. 5, a tag having 3 dB gain uses a 3 cm diameter retroflector and with FIG. 6, a tag have 20 dB gain uses a 30 cm diameter retroflector. Curves 506 and 606 in FIGS. 5 and 6 provide a comparison of the received peak power in dBm versus range between the interrogator and a tag for the two retroflector sizes.

With FIG. 7, an interrogator signal having a frequency of 10 GHz and transmit power of 10 kW is transmitted from a transmit antenna having 12 dB gain. Thermal noise limits 502, 504 are shown for 1 KHz and 100 KHz bandwidths, respectively. With FIG. 7, a tag having 3 dB gain uses a 3 cm diameter retroflector. Curves 506 and 706 in FIGS. 5 and 7 provide a comparison of the received peak power in dBm versus range between the interrogator and a tag for the tow transmit power levels.

Figure 8:
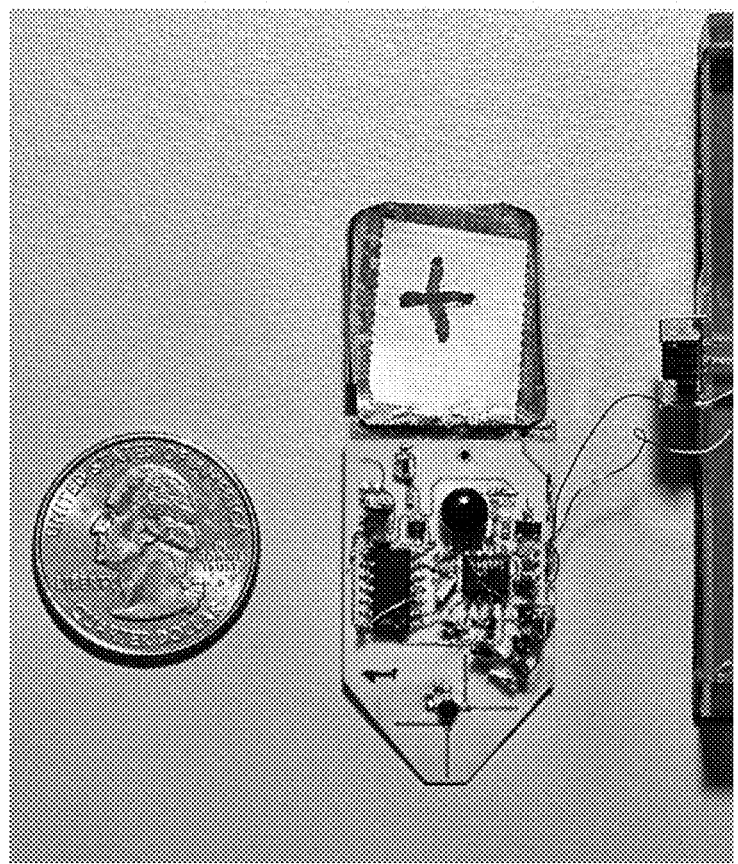
FIG. 8 depicts an operational prototype of a semi-passive RF tag of the present invention constructed by the inventor.
Figure 9:
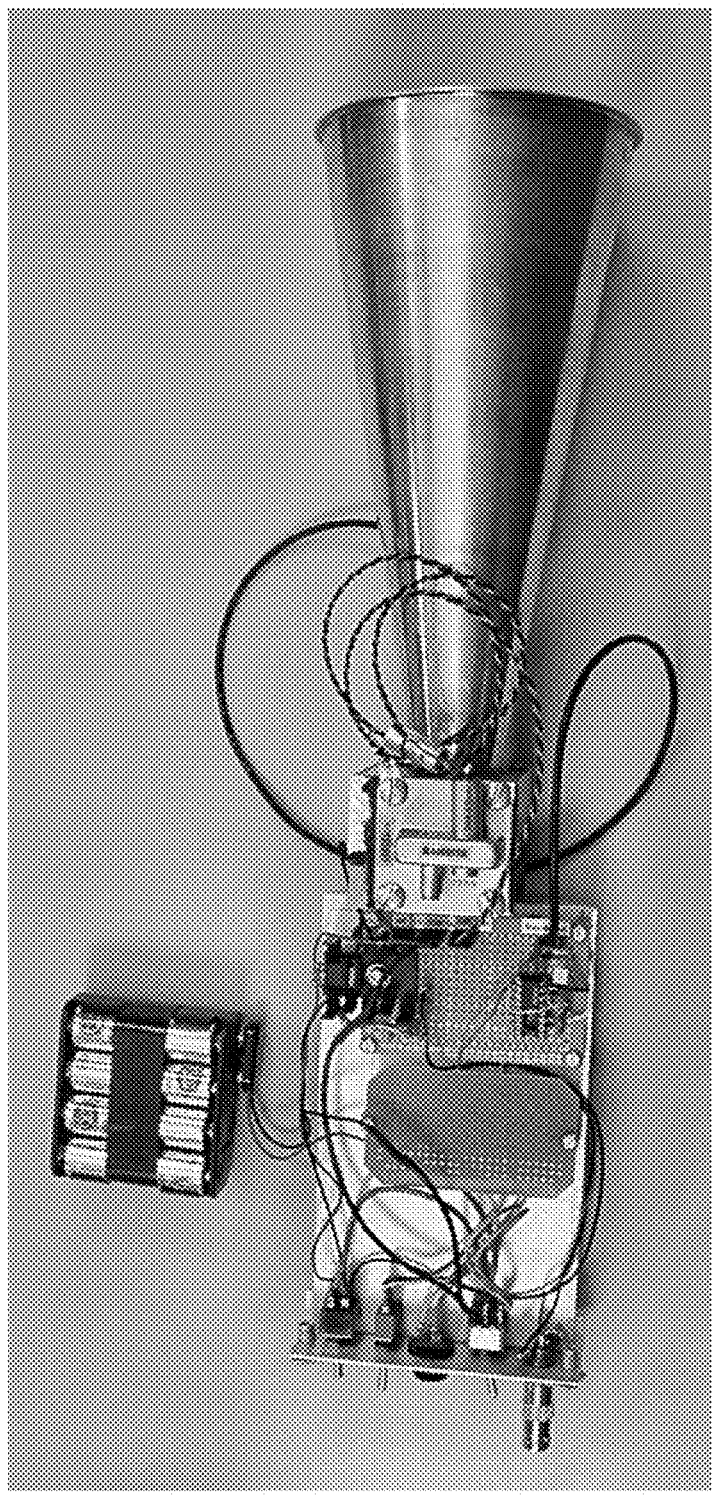
FIG. 9 depicts an operational prototype of an interrogator of the present invention constructed by the inventor.

FIG. 8 and FIG. 9 depict operational prototypes constructed by the inventor. FIG. 8 shows a tag with its antenna to the left of the structure. The black dot in the center of the lines making up the antenna is a transistor used to modulate the load on the antenna. FIG. 9 shows a homodyne transceiver used to transmit and receive modulated RF back from the tag, and contains circuitry to demodulate the signal returned and use it to identify the tag by the information imposed on it by the tag's modulator and microprocessor. The tag is operated by a watch battery under the "+" sign and draws only 0.75 mA in continuous operation. This system operates at 10 GHz.

Various other techniques can be used in accordance with the invention to accommodate various operational environments. One skilled in the art will recognize that the use of one or more these techniques involves tradeoffs of cost, complexity, and performance. These techniques include:

Imposing polarization vector modulation on the interrogator's carrier to improve transmit/receive isolation and to determine the range of the tag while employing a single RF frequency carrier.

Using a reflector or dielectric lens to beam shape the retro reflected pattern of the MR to increase the positional angle over which significant RF power will be retro reflected back to the interrogator.

Using synthetic dielectrics for the retro reflector and/or beam former to improve the beam width of the MR response.

Arraying tag antennas for coherent and/or non-coherent operation to increase the range of operation where coherent operation requires phase accurate retro reflection, while non-coherent does not.

Configuring the MR to rotate the polarization angle of the retro reflected pattern to improve contrast.

Configuring the MR to convert the handedness of a circular polarized retro reflected pattern, for example, converting right handedness to left handedness.

Configuring the MR to convert a linear retro reflected pattern to a circularly polarized retro reflected pattern.

In many applications it is desirable for a retro reflector to provide an efficient reflection over a wider angle than can be accomplished with the known retro reflector types. In fact, it would be most desirable to provide a solid retro reflection angle of 180° to provide hemispheric coverage when it is, for example, used as a tag attached to a flat surface such as a carton or other container. Using the known retro reflector art alone would require at least four separate tags oriented at right angles to one another to provide hemispheric coverage.

The present invention overcomes this problem by embedding the retro reflector within a suitable dielectric, i.e. one that is essentially transparent to the electromagnetic (EM) waves used, and that possesses a sufficiently high dielectric constant. With this approach, the rays from an external source that enter the surface facing the source from any angle within a full hemisphere will be constrained inside the dielectric to a solid angle within which the retro reflector is most efficient. Therefore, waves directed at a tag constructed in this manner will be made responsive to waves from a full hemisphere of angles from an interrogator's source of EM waves. In a warehouse this would mean that a single tag could be placed on the surface of a container placed in a shelving system, and be interrogated from any angle in the aisle.

When EM energy passes through the boundary between two transparent materials with different dielectric constants it will be bent from a straight line according to a function called Snell's Law:

$$N_1 \sin\theta_1 = N_2 \sin\theta_2$$

N is usually termed the refractive index of the material and is equal to $\sqrt{\in}$. This law governs the EM waves whether they are in the RF spectrum or optical region. While it is expected that most of the applications of this technology will relate to RF usage and the examples below will reflect that bias, the invention is general and may be used from a few kilocycles all the way through microwaves, terahertz waves, infrared, visible, ultraviolet, and to near x-rays. To simplify teaching of this invention, it can be assumed that the first dielectric is the air (or vacuum if used in space) and the second dielectric is a material in which the tag will be embedded. The dielectric constant of the first dielectric, or $\in_1$, will be nearly equal to 1 and will be assumed to be equal to 1 and the dielectric constant of the second dielectric, or $\in_2$, will be greater than 1. However, the first dielectric can be something other than air (or vacuum).

Figure 11A:
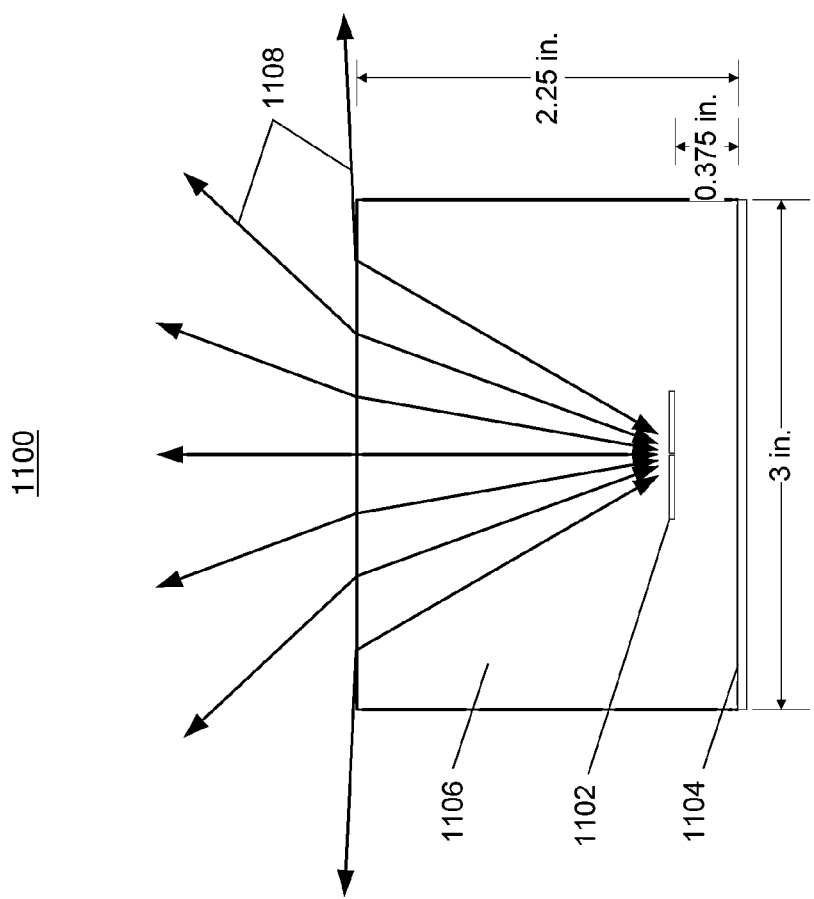
FIG. 11A depicts ray directions to and from an exemplary antenna embedded in a dielectric material.

FIG. 11A depicts an improved reflector in accordance with the present invention where a dipole antenna 1102 is placed in front of a back reflector 1104 and is embedded in a dielectric material 1106, for example, a polyester dielectric material. As seen in FIG. 11A, the rays 1108 entering and leaving the dielectric material 1106 are bent as a function of the angle of incidence on the surface of the dielectric material 1106. The rays are bent at the same angles whether they are entering or leaving it. In this example, the rays have a 4 GHz frequency, and the dielectric constant of the dielectric material is 4, so the angles illustrated are a consequence of a refractive index equal to 2. It can be seen that from about 90° with respect to the antenna (vertical angle) to about 75°, the angle inside the dielectric is multiplied by about 3 with respect to the angle in the air. This means that waves entering the surface from angles up to 180° will be constrained to an approximate 60° cone once they enter the dielectric material.

Figure 11B:
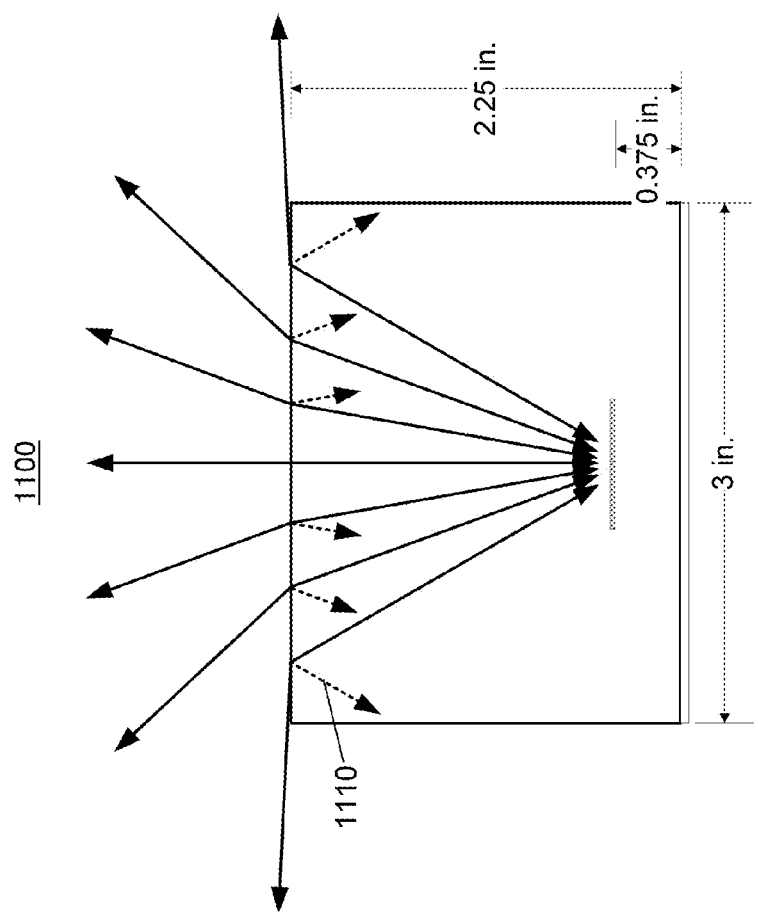
FIG. 11B depicts reflections of antenna emissions occurring at the surface of the dielectric that occur due to Fresnel's Law.

As a practical matter the choice of dielectric constant of the material is affected by another function called "Fresnel's Law". This function is used to predict the amount of reflection that will be incurred by an EM wave passing from one dielectric constant to another. Generally, the larger the ratio of $N_2/N_1$ the larger the reflection will be for a given angle of incidence. Also, for a given $N_2/N_1$ the greater the angle deviates from normal to the surface dividing the two media, the larger the reflection will be. An exception to this rule is that for one polarization and critical angle the reflection drop to essentially zero, that angle being called Brewster's Angle. It is therefore an engineering choice to maximize the operational angle of the retro reflector whereby larger values of $N_2$ produce a smaller cone angle inside the material but also result in an increased loss due to reflection of the EM waves at the surface. FIG. 11B illustrates the reflections 1110 expected from emissions that originate from a dipole antenna.

Figure 11C:
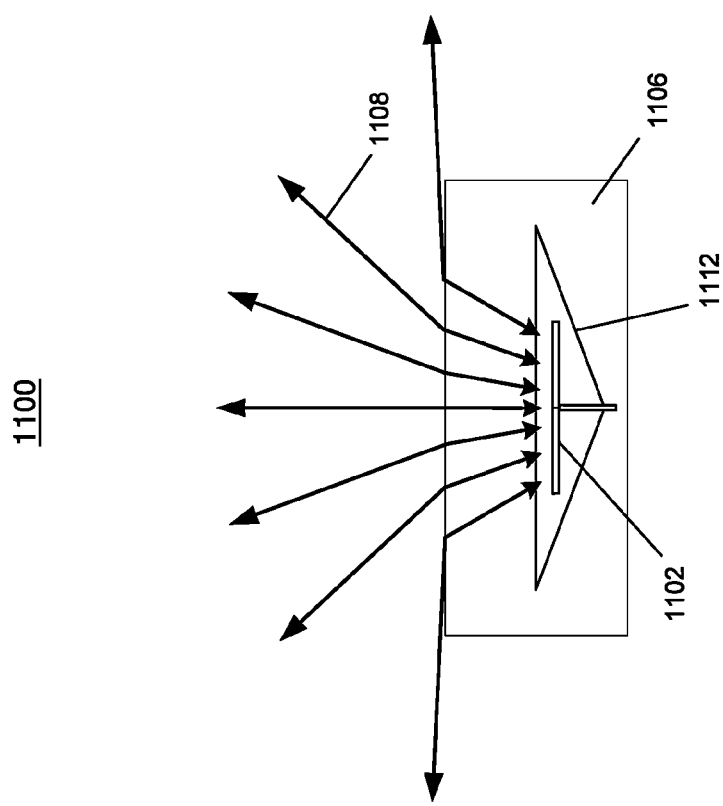
FIG. 11C depicts a side view of a dipole antenna and a corner reflector embedded inside a dielectric material.
Figure 11D:
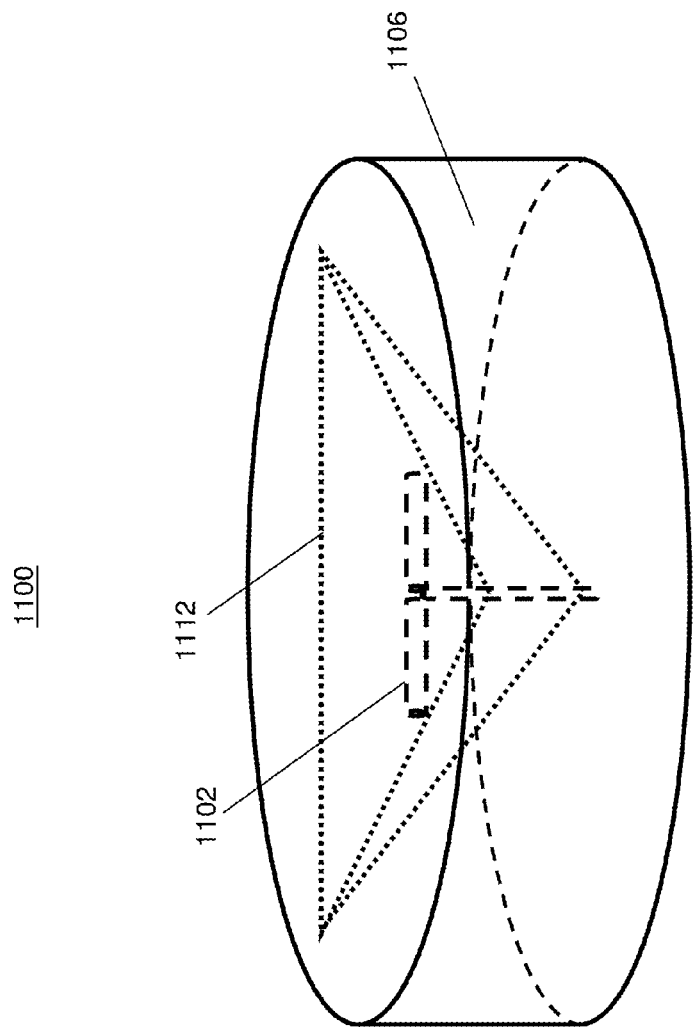
FIG. 11D depicts a three dimensional view of a dipole antenna and a corner reflector embedded inside a dielectric material.

FIGS. 11C and 11D provide a side view and a three dimensional view, respectively, of another improved reflector in accordance with the present invention where a dipole antenna 1102 is oriented above a corner reflector 1112. Both the antenna 1102 and the corner reflector 1112 are embedded in a dielectric material 1106. The direction of the rays 1108 entering and leaving the reflector are shown for the case of a dielectric constant of the material 1106 being equal to 4.

An optional element of this invention is to apply several layers of different dielectric constant materials on the surface, i.e. known in prior art as a dichroic filter, to decrease the unwanted surface reflection by matching the impedances of the two media. The number, thicknesses and required dielectric constants of these layers can be determined by using known techniques and therefore will not be described here.

It is intended that this invention will cover the span of embedding of the retro reflector from just filling the reflector to providing a large layer of material in front of the reflector. The latter is useful because it effectively increases capture cross section of the device by bending rays that would have missed the reflector into a cone that will hit it, thereby increasing its efficiency or gain.

Another improvement afforded by the use of the dielectric coating is that antenna techniques may be employed that would otherwise be unsuitable for the tagging application. One example is the use of a dipole antenna longer than $\lambda/2$, i.e. longer than half the wavelength of the EM waves being employed. Such antennas produce higher gain but have the unfortunate effect of producing a highly lobed pattern in which efficiency drops to near zero at particular angles. By embedding such an antenna into the dielectric, the $N_2/N_1$ can be set to match the operational cone angle within the dielectric material to the main lobe of the antenna, which then is spread evenly to a full hemisphere at the surface. Similarly, highly directional structures may be used that combine high gain with hemispheric operation. Some examples of the latter would be a yagi, a horn or a log periodic structure.

The tag-interrogator system can be used to monitor assets, objects, people, animals, vehicles, inventory, cargo in trains, ships, semi trailers, or the trains, ships, and semi trailers themselves. It can be used indoors or outdoors, in high multipath environments or low multipath environments, and can be useful for through-wall location. It can be used for long range applications such as scenarios where the interrogator and tags are on the ground or where the interrogator(s) is in the air associated with, for example, an aircraft such as a plane, helicopter, or unmanned air vehicle (UAV), and the tag(s) are on the ground (or water) associated with personnel, vehicles, and equipment, tanks, weapons, unmanned ground vehicles, etc. and vice versa. As such, the tag-interrogator system can be used for sports applications, identification of friend vs. foe (IFF), locating lost tagged items (e.g., black boxes, escaped prisoners, escaped pets or farm animals), and locating buried tagged land mines. It can also be used for short range applications such as animal and employee ID systems, emergency responder tracking, swat team member tracking, body instrumentation for virtual reality gaming, and even intra-body biomedical monitoring.

In one example application, military personnel, vehicles, and equipment (e.g., rocket launchers) have tags associated with them. The tags are interrogated by interrogators located on the ground (or water) and/or in the air (e.g., a UAV) to provide situational awareness and IFF information for command and control purposes.

In another example application, a helicopter can interrogate a neighborhood to find a lost pet or interrogate an area around a prison to locate an escaped prisoner. Similarly, a plane might interrogate a mountain range or an expanse of water where a plane is believed to have gone down looking for the signature of a black box or perhaps a tag on a life raft or live preserver associated with a survivor of an accident.

In one scenario, cargo containers have a tag associated with them that can be detected by interrogators distributed at places (i.e., locations) about a shipyard, airport, railroad yard, manufacturing facility, storage facility, etc. where they are moved about. Using interrogation results, identification information, and correlated information in databases, the location of the cargo containers can be tracked and monitored as they are processed through a facility or otherwise stored there.

As described previously, tags can also have associated with them various sensors and/or other informational sources allowing them to convey information other than their identity. For example, a tag associated with a cargo box or firefighter might also be interfaced with a temperature sensor, heart monitor, smoke sensor, etc. thereby allowing decisions to be made based upon sensor readings. Similarly, a tag associated with a soldier might interface with one or more sensors intended to detect nuclear, biological, or chemical weapons.

Based on the foregoing, a tag comprises an antenna that receives an interrogation signal via a first transmission medium. The first transmission medium has a first dielectric constant. A retro reflector coupled to the antenna radiates a return signal in response to the interrogation signal. The return signal is modulated in accordance with a pattern that conveys information, for example, about a person, animal, object, or place. The return signal can be modulates using any suitable technique including amplitude shift keying, phase shift keying, frequency shift keying, quadrature amplitude, quadrature phase or orthogonal frequency modulation methods or any suitable combination thereof.

A dielectric material coupled to the retro reflector has a second dielectric constant that is different from the first dielectric constant. In one embodiment, the second dielectric constant is higher than the first dielectric constant. The dielectric material provides a second transmission medium adjacent to the first transmission medium for the return signal and interrogation signal. In one embodiment, the retro reflector is embedded within the dielectric material.

According to some of the more detailed features of the invention, the interrogation signal is generated at a source in a first location and the return signal is radiated from a second location. Under this arrangement, the pattern conveys information for deriving to a range between the first and second locations or for deriving a position of the second location relative to a reference.

According to some other more detailed features of the invention, the tag comprises a sensor that provides a sensed signal that corresponds to the pattern that conveys information. The sensed signal can relates to a location coordinate, speed or position.

A method for communication of information comprises receiving an interrogation signal via a first transmission medium having a first dielectric constant at an antenna and radiating a return signal in response to the interrogation signal from a retro reflector coupled to the antenna via a dielectric material having a second dielectric constant that provides a second transmission medium for the return signal and interrogation signal adjacent to the first transmission medium. The method requires modulating the return signal in accordance with a pattern that conveys information that pertains to a person, animal, object, or place, and demodulating the return signal to determine the information, the information is used for monitoring the person, animal, object, or place based upon the demodulated information.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. A tag, comprising:
   a dipole antenna that receives from an interrogator an interrogation signal via a first transmission medium having a first dielectric constant, said dipole antenna reflecting energy from said interrogation signal, said energy comprising backscatter energy and forward scatter energy;
   a retro reflector coupled to said dipole antenna for retro reflecting at least some of said forward scatter energy along with said back scatter energy as a return signal to said interrogator, said retro reflecting increasing the amount of reflected energy that is returned to said interrogator independent of the angle between said interrogator and said retro reflector, said return signal being modulated in accordance with a pattern that conveys information;
   a dielectric material coupled to said dipole antenna and said retro reflector to beam shape the retro reflected pattern, said dielectric material having a second dielectric constant that is different from the first dielectric constant, said dielectric material providing a second transmission medium adjacent to said first transmission medium for said return signal and said interrogation signal.

2. The tag of claim 1, wherein said second dielectric constant is higher than the first dielectric constant.

3. The tag of claim 1, wherein said return signal is modulated using at least one of amplitude shift keying, phase shift keying, frequency shift keying, quadrature amplitude, quadrature phase or orthogonal frequency modulation methods.

4. The tag of claim 1, wherein said information pertains to a person, animal, object, or place.

5. The tag of claim 1, wherein said retro reflector is embedded within the dielectric material.

6. The tag of claim 1, wherein said interrogation signal is generated at a source in a first location and said return signal is radiated from a second location.

7. The tag of claim 6, wherein said pattern conveys information for deriving a range between said first location and said second location.

8. The tag of claim 6, wherein said pattern conveys information for deriving a position of the second location relative to a reference.

9. The tag of claim 1 further comprising a sensor that provides a sensed signal that corresponds to the pattern that conveys information.

10. The tag of claim 9, wherein the sensed signal relates to at least one of a location coordinate, speed or position.

11. A method for communication of information comprising:
receiving from an interrogator an interrogation signal via a first transmission medium having a first dielectric constant at a dipole antenna, said dipole antenna reflecting energy from said interrogation signal, said energy comprising backscatter energy and forward scatter energy;
retro reflecting at least some of said forward scatter energy along with said back scatter energy as a return signal to said interrogator using a retro reflector coupled to said dipole antenna via a dielectric material coupled to said dipole antenna and said retro reflector that beam shapes the retro reflected pattern, the dielectric material having a second dielectric constant that provides a second transmission medium for the return signal and interrogation signal adjacent to said first transmission medium, said retro reflecting increasing the amount of reflected energy that is returned to said interrogator independent of the angle between said interrogator and said retro reflector, said return signal being modulated in accordance with a pattern that conveys information that pertains to a person, animal, object, or place;
demodulating said return signal to determine said information; and
monitoring said person, animal, object, or place based upon said demodulated information.

12. The method of claim 11, wherein said second dielectric constant is higher than the first dielectric constant.

13. The method of claim 11, wherein said return signal is modulated using amplitude shift keying, phase shift keying, frequency shift keying, quadrature amplitude, quadrature phase or orthogonal frequency modulation methods.

14. The method of claim 11, wherein said retro reflector is embedded within the dielectric material.

15. The method of claim 11, wherein said interrogation signal is generated at a source in a first location and said return signal is radiated from a second location.

16. The method of claim 11, wherein said pattern conveys information for deriving a range between said first location and said second location.

17. The method of claim 15, wherein said pattern conveys information for deriving a position of the second location relative to a reference.

18. The method of claim 11, wherein said information pertains to a person, animal, object or place.

* * * * *